JACKSON & BURCHINAL.
Carriage-Hub.
No. 18,097
Patented Sept. 1, 1857.
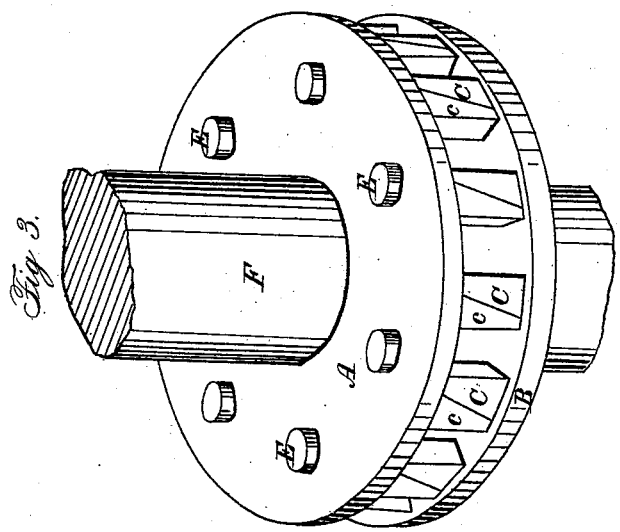
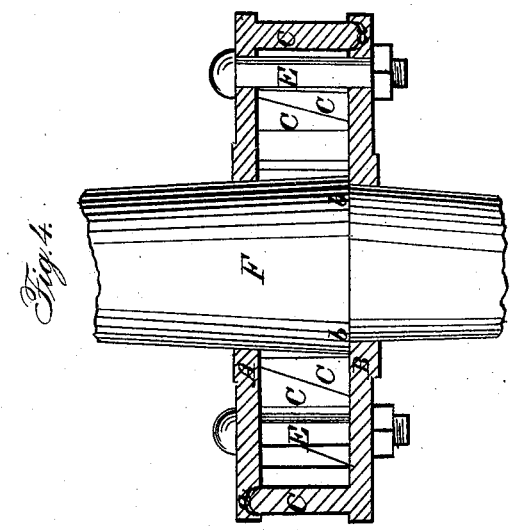
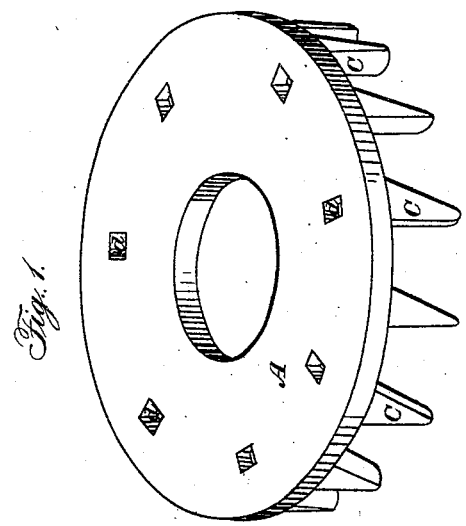
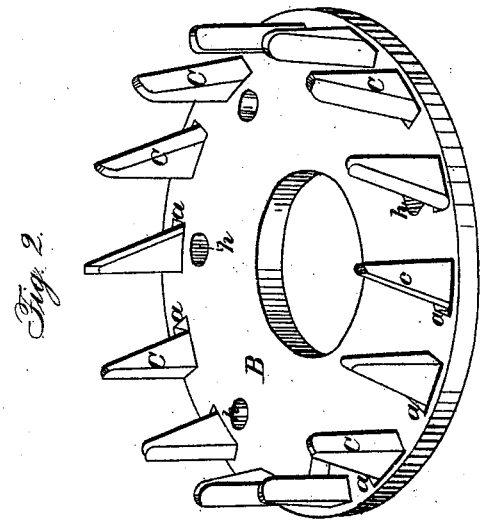

UNITED STATES PATENT OFFICE.

JAS. W. JACKSON AND L. W. BURCHINAL, OF SMITHFIELD, PENNSYLVANIA.

HUB FOR CARRIAGE-WHEELS.

Specification of Letters Patent No. 18,097, dated September 1, 1857.

*To all whom it may concern:*

Be it known that we, JAMES W. JACKSON and LUTHER W. BURCHINAL, of Smithfield, in the county of Fayette and State of Pennsylvania, have invented certain new and useful Improvements in Hubs for Carriage-Wheels; and we do hereby declare that the following is a full, clear, and exact description of its construction and operation, reference being had to the accompanying drawings, in which—

Figures 1, and 2, represent the two parts which constitute said hub. Fig. 3 represents a perspective view of said hub. Fig. 4, represents a vertical cross section through the same.

To enable others skilled in the art to make and use our invention, we will proceed to describe the same with reference to the drawings.

A and B, represent two metal plates which are formed on one side with wedge shaped tenons C; the taper of these wedges on two corresponding tenons is such that when the two plates are brought opposite each other the tapering faces of the wedges will fit closely to each other and thus form a hub into the recesses of which the spokes can be inserted. The plates A, B, are also formed with mortises $a$, at such points where the tapering sides of the tenons C, intersect the faces of the plates A, B. These mortises serve to receive the points or ends of the tapering tenons C, of each plate when the two plates are fitted together to form the hub; in this case the two plates are passed over the axle or shaft F which is made slightly tapering as represented in Fig. 4, the plate B, abutting against the neck $b$, and the plates A, B, may then be forced together by operating the nuts of the screw bolts E, said bolts passing through the holes $d$ and $h$, of the plates A, B. As the plates are forced together the distance between the two plates is diminished, thus securing the ends of the spokes which have been inserted into the mortises of the hub, but at the same time the tenons C, are also made to expand as the ends of the tapering tenons do not come up against the solid material of the plates A, B, but pass into the mortises $a$, and thus the mortises D, of the hub are made to contract in the direction of their width, as well as in the direction of their length, and the ends of the spokes will be grasped on all four sides by solely operating the nuts of the screw bolts E.

Having thus described the nature of our invention we would state that we do not claim a hub composed of two plates and corresponding tenons within which the spokes are to be inserted, but—

What we do claim as our invention and desire to secure by Letters Patent is,—

Making the mortises of the hub adjustable in two different directions, so that the spokes of the wheel shall be grasped on their four sides simultaneously, when the two plates of the hub are forced together by the screw bolts, in the manner substantially set forth.

JAS. W. JACKSON.
LUTHER W. BURCHINAL.

Witnesses:
  G. W. NESTZOG,
  WILLIAM BURCHINAL.